United States Patent [19]
Bachman et al.

[11] Patent Number: 5,123,081
[45] Date of Patent: Jun. 16, 1992

[54] TEMPERATURE CONTROL SYSTEM FOR MOTORS AND POWER COMPONENTS OF A MATERIAL HANDLING VEHICLE

[75] Inventors: Michael S. Bachman, Port Crane; David L. Kellogg, Greene; James M. Simmons, Jr., Newark Valley; Issac Avitan, Vestal, all of N.Y.

[73] Assignee: Raymond Corporation, Greene, N.Y.

[21] Appl. No.: 558,921

[22] Filed: Jul. 27, 1990

[51] Int. Cl.⁵ .............................................. H02H 5/24
[52] U.S. Cl. .................................... 388/934; 388/910; 388/815; 361/24; 361/27; 361/106; 318/473
[58] Field of Search .............................. 361/24, 25–27, 361/103, 106; 388/934, 933, 910, 842–845, 847, 809–815; 318/471–473

[56] References Cited

U.S. PATENT DOCUMENTS

| | | | |
|---|---|---|---|
| 4,008,426 | 2/1977 | Ogura | 388/824 X |
| 4,131,832 | 12/1978 | Cavil et al. | 388/807 |
| 4,506,199 | 3/1985 | Asche | 388/816 |
| 4,626,753 | 12/1986 | Letterman | 312/471 X |
| 4,675,777 | 6/1987 | Watrous | 361/106 |
| 4,727,450 | 2/1988 | Fachinetti et al. | 361/103 |
| 4,849,677 | 7/1989 | Krüger | 361/25 X |

OTHER PUBLICATIONS

Avitan, Issac and Skorman, Victor. Mathematical Modeling and Computer Simulation of a Seperately Excited dc Motor with Independent Armature/Field Control, Dec. 1990, 488.

Primary Examiner—William M. Shoop, Jr.
Assistant Examiner—David Martin
Attorney, Agent, or Firm—Salzman & Levy

[57] ABSTRACT

The present invention features a system and method for preventing overheating of a motor and/or power amplifier of a material handling vehicle by controlling the performance of the vehicle as a function of motor and-/or power amplifier temperature. Temperature sensors are connected to the motor and power amplifier for determining their operating temperatures. A controller is connected to each temperature sensor and to the motor for controlling acceleration of the motor as a function of either or both temperatures, so that both the motor and the power amplifier will not overheat. In controlling acceleration of the motor, the invention provides a mechanism for changing acceleration by discrete steps or continuously according to a performance curve which may be linear or otherwise.

25 Claims, 7 Drawing Sheets

5,123,081

TEMPERATURE CONTROL SYSTEM FOR MOTORS AND POWER COMPONENTS OF A MATERIAL HANDLING VEHICLE

BACKGROUND OF THE INVENTION

The present invention relates to motor controls and, more particularly, to control systems that prevent heat from damaging vehicle power components, such as motor and power heads, during their operation.

The reliability of electric DC motors and their power amplifier circuits is greatly reduced by thermal stresses. Typically these devices are protected by thermal switches which shut off power to the control system during over-temperature conditions. This is often unacceptable in industrial truck applications since the operator is left with a inoperable vehicle.

Typically, the thermal switch shut-off temperature is selected to be near the system's thermal limit so as to maximize productivity. However, many times the damage is already done before the thermal switch is activated.

U.S. Pat. No. 4,626,753, issued to Letterman, teaches a process for controlling the speed of an electric motor. Motor temperature is sensed and compared to a reference value. The two values are summed and employed as a reference of motor current. Motor current is sensed and compared to the reference value and a prescribed setpoint. The three values are summed and employed as a reference of motor speed. When actual motor temperature exceeds a given value, the current provided to the motor thereby reducing the speed thereof is reduced. This in turn reduces the $I^2R$ power loss manifested as heat within the motor, thus eventually decreasing the temperature of the motor.

Another common method of controlling motor damage due to thermal stress is to sense the actual temperature, through use of a thermistor, and then reduce the motor speed as a function of the measured temperature. In this way, the operator is forewarned of the overheating condition and can take the appropriate steps to reduce the work load on the vehicle. Should the operator ignore or fail to recognize the warning, however, the motor will eventually overheat and probably be damaged. The power amplifier is also at risk of damage in this situation.

Unfortunately, merely reducing motor speed does not always guarantee that the heat producing currents of the motor and power amplifier will be reduced. Therefore, to effectively reduce these currents and consequently allow the motor and power amplifier to cool, down, it becomes necessary to limit the velocity and acceleration (rate of change of velocity) of the vehicle.

The current drawn by a DC motor is controlled by the required torque. The torque is a function of friction, velocity, and acceleration, as represented by the following equation:

$$T = K \cdot \phi \cdot i = J \cdot \alpha + B \cdot \omega + F$$

where:
T = torque of the motor, N.m
J = inertia of the truck reflected back on the motor, $Kg \cdot w^2$
$\omega$ = angular velocity of the motor, rad/sec
B = viscous damping of the truck reflected back on the motor, (N.m)/(rad/sec)
$\alpha$ = angular acceleration of the motor, radians
F = constant friction of the truck reflected back on the motor, N.m
K = torque constant of the motor, N.m/webers.amps
$\phi$ = air gap magnetic flux of the motor, webers
i = armature current of the motor, amps Since truck inertia J is typically much larger than viscous damping B, the torque required to accelerate the vehicle is greater than the torque required to maintain it at a given speed. For applications that routinely require speed variations, such as material handling vehicles, the term of the above equation relating to acceleration ($J \cdot \alpha$) becomes a much more significant contributing factor to the overall torque equation than it does in a "steady state" (i.e., constant velocity) situation. impact on motor current than does velocity.

Therefore, the invention departs from the common, prior art teaching of speed reduction as a means of controlling motor overheating. Rather, this invention concentrates upon reducing acceleration, as the primary technique of relieving the overheated condition.

The present invention provides the operator with feedback information to control the vehicle before shutdown occurs. The truck operator is given the option of using several levels of derated performance in which to effectuate vehicle cool down. A truck equipped with circuitry for implementing this inventive performance limiting scheme is protected from experiencing a shutdown due to excessive temperature.

The temperature limiting technique of this invention introduces hysteresis between each performance limiting step. This means that the truck must be allowed to cool down a predetermined number of degrees below the trip point, before performance can be restored a single incremental step. This procedure eliminates cyclic surging that would normally occur at the limit trip point absent hysteresis.

It is also possible in accordance with this invention, to create a continuous and substantially linear function of vehicular performance. In such a technique the truck performance is limited as a function of temperature. Since the performance of the vehicle is defined by both velocity and acceleration, it follows that for a continuous technique, the incremental performance levels become too small to require intermediate hystere is adjustments.

SUMMARY OF THE INVENTION

The present invention features a system for controlling a variable speed electric motor to prevent overheating. A temperature sensor is connected to the motor for determining operating temperature. A performance controller is connected to the temperature sensor and to the motor for controlling performance of the motor. The performance controller is adapted to control acceleration of the motor as a function of temperature, so that an overheated motor condition is prevented.

In another embodiment of this invention, a temperature sensor is connected to the power amplifier of the motor control circuitry. The performance controller is designed to control motor acceleration as a function of the power amplifier temperature.

In a preferred embodiment, a mechanism is provided for controlling acceleration of the motor in discrete, incremental steps.

In an alternate embodiment, such acceleration control is effectuated by a continuous adjustment.

BRIEF DESCRIPTION OF THE DRAWINGS

A complete understanding of the present invention may be obtained by reference to the accompanying drawings, when considered in conjunction with the detailed description, in which.

DESCRIPTION OF THE PREFERRED EMBODIMENT

Generally speaking, the invention pertains to a technique for preventing or reducing overheating in material handling vehicles. Contrary to the standard teachings of the prior art, that suggest limiting top speed of the vehicle as a means to regulate the temperature of the drive system, the present invention has determined that controlling the rate of velocity change (both up and down) is far more effective for the intended purpose.

Figure 1:
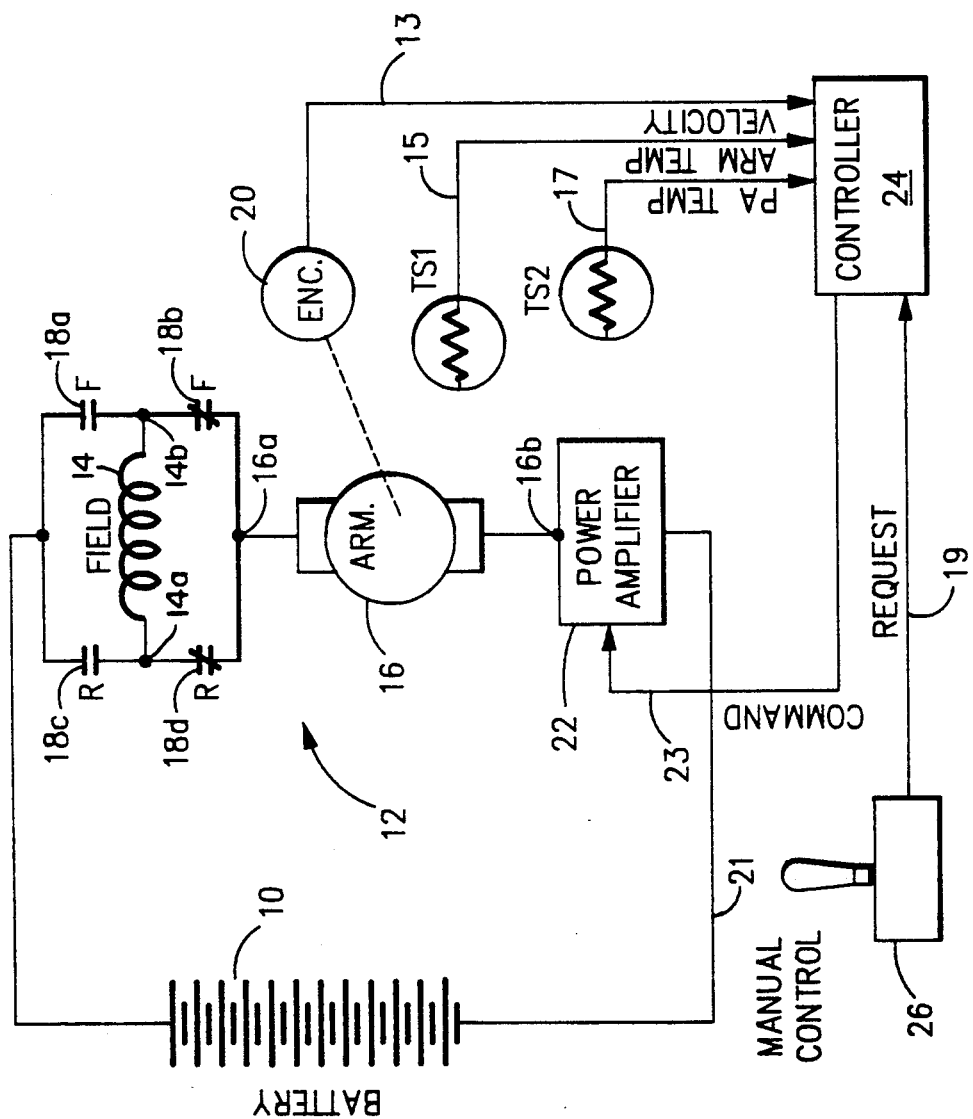
FIG. 1 shows a block diagram of the system upon which the inventive method is based.

Referring now to FIG. 1, the vehicular control system of this invention is shown, and consists of a DC 24 or 36 volt battery, 10. A series wound DC brush motor, shown generally by reference numeral 12, is connected to battery 10. Motor 12 has a separate terminals 14a and 14b, respectively, for the field winding, and separate terminals for the armature, 16a and 16b, respectively.

Forward contactors 18a and 18b, respectively, and reverse contactors 18c and 18d are respectively provided, to control the rotational direction of DC motor 12.

An optical encoder 20 is connected proximate the armature shaft of DC motor 12. A typical optical encoder for this purpose can be Model No. OEW-256-2MD-5-324 manufactured by Data Technology, Inc. in the preferred embodiment. A thermistor temperature sensor TSI is mounted to the case of motor 12 by means well known in the art.

A 450 v, 500 amp power amplifier 22 is connected to motor armature 16 at terminal 16b, and to battery 10 via line 21. A second thermistor temperature sensor TS2 is mounted to a heat sink (not shown) of the power amplifier 22. A microcontroller, Model No. 68HC11 manufactured by Motorola Corp., is respectively connected to power amplifier 22 and encoder 20. Data representative of temperature is also provided to controller 24 by means of thermistor sensors TS1 and TS2. Power amplifier 22 converts the low level output signals of controller 24 to higher voltage and current required by the DC motor 12.

A manual speed control or throttle 26, is connected to controller 24 via line 19. Thus, controller 24 receives: (1) temperature signals from the thermistor TS2 of amplifier 22, via line 17, and from thermistor TSI of armature 16, via line 15, (2) manual speed requests from throttle 26, and (3) actual motor speed from encoder 20, via line 13. The controller 24 processes these signals and generates instructions for power amplifier 22 via arrow 23, as described in further detail hereinbelow.

Figure 2:
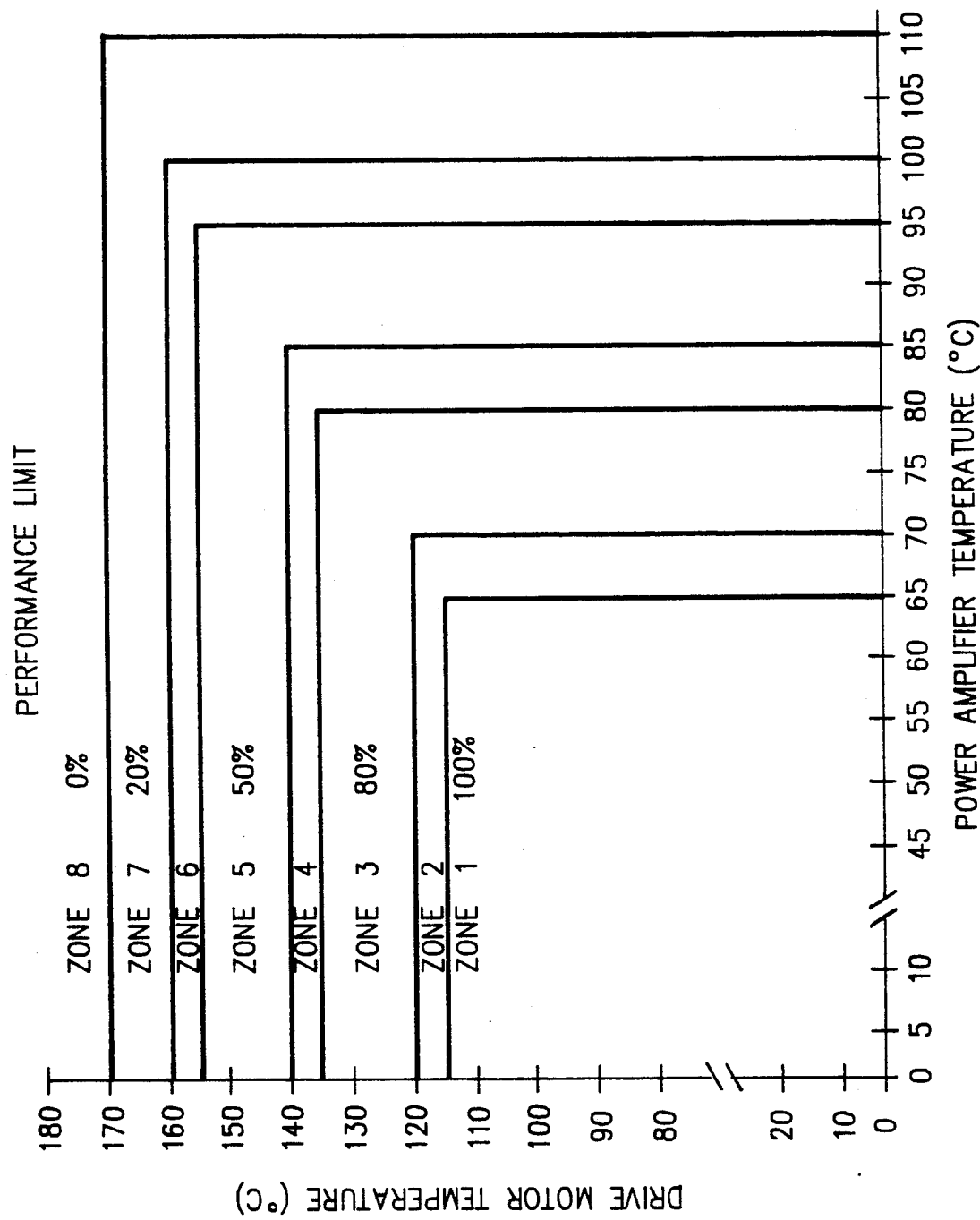
FIG. 2 depicts a graph of drive motor temperature and power amplifier temperature along a performance limit line of the vehicle, in accordance with the present invention.

FIG. 2 depicts a graph of drive motor temperature and power amplifier temperature along the performance limit line of the vehicle.

There are shown five (5) discrete performance limit zones in this multi-step thermal limit implementation (100%, 80%, 50%, 20%, and 0%). The 100% zone reflects the area along the performance curve that the truck is allowed to travel at full speed and maximum acceleration. The 0% zone indicates the area along the performance curve wherein truck movement is prevented. The intermediate zones (80%, 50%, 20%) depict a certain, permissible percentage of full speed and maximum acceleration.

Zone 1 indicates that full performance (100%) is permitted, whenever the motor temperature is below 115° C., and the amplifier temperature is below 65° C.

Zone 2 represents a hysteresis band. If the performance was previously in Zone 3, the 80% performance limit will be held until the motor temperature drops below 15° C., and the amplifier temperature drops below 65° C. At this point, the performance will go to 100%.

If the performance was previously in Zone 1, the performance limit will not drop to 80% until either the drive motor temperature goes above 120° C., or the amplifier temperature goes above 70° C.

Zone 3 indicates that 80% performance is allowed when both the motor temperature is below 135° C., and the amplifier temperature is below 80° C.

Zone 4 represents a hysteresis band. If the performance was previously in Zone 5, the 50% performance limit will be held until the motor temperature drops below 135° C., and the amplifier temperature drops below 80° C., at which point the vehicle performance will become 80%.

If the performance was previously in Zone 3, and the motor temperature rises above 140° C., or the amplifier temperature exceeds 85° C., then vehicle performance will decrease to the 50% level.

Zone 5 indicates that half performance (50%) is permitted whenever the motor temperature is below 155° C., and the amplifier temperature is below 95° C.

Zone 6 represents a hysteresis band. If the performance was previously in Zone 7, the 20% performance level will be held, until the motor temperature drops below 155° C., and the amplifier temperature decreases to 95° C. At this point, the performance level will increase to 50%.

If the performance was previously in Zone 5, the performance level will not drop to 20% until either the drive motor temperature goes above 160° C., or the amplifier temperature goes above 100° C.

Zone 7 indicates that the permissible vehicular performance level is only 20%. This occurs whenever the motor temperature drops below 170° C., and the amplifier temperature drops below 110° C.

The Zone 8 level of performance represents truck shutdown (0% performance). This condition is reached whenever the motor temperature rises above 110° C. or the amplifier temperature exceeds 170° C.

When Zone 8 is reached, the truck will be automatically turned off by the controller, and an alarm will sound. The truck will not travel again until the key is turned off and on again, and both the motor and amplifier temperature have fallen into zone 7.

Figure 3:
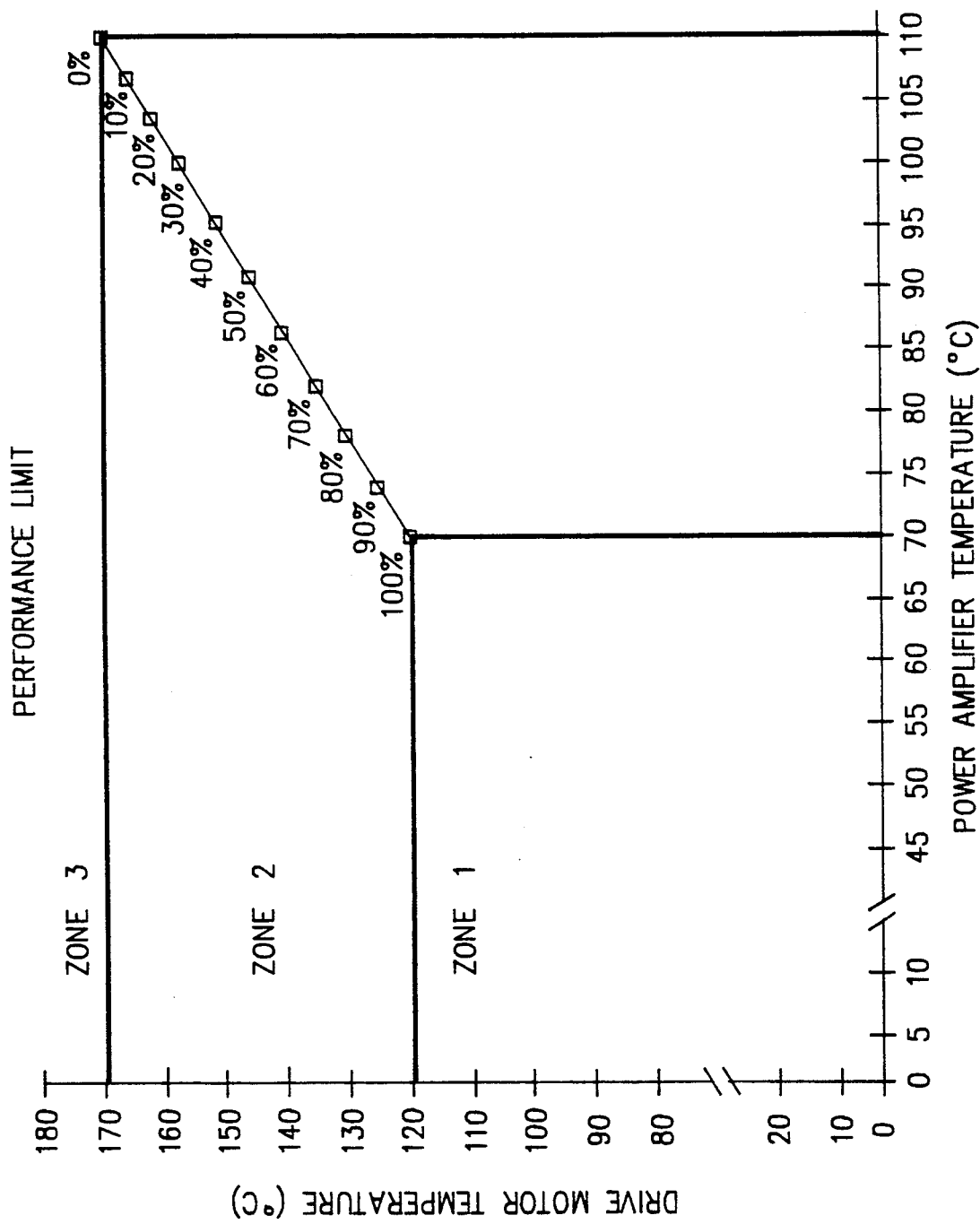
FIG. 3 illustrates a graph of drive motor temperature and power amplifier temperature plotted along a continuous performance line of the vehicle.

FIG. 3 illustrates a graph of drive motor temperature and power amplifier temperature plotted along the performance line of the vehicle. In this graph, the performance limit is continuous from 100% to 0%, as opposed to stepwise depiction, shown in FIG. 2. This graph, although representing a continuous line of performance, can be visualized as having an infinite number of steps, i.e. as a multi-step, temperature limiting process. However, in reality, there is always a limitation on the number of actual steps that the process can achieve. As will be observed, the former 80%, 50% and 20% zones of FIG. 2, now fall in the middle of Zone 2 of FIG. 3.

Zone 1 indicates that full performance (100%) is permissible, whenever the motor temperature is below 115° C., and the amplifier temperature is below 65° C.

Zone 2 is the linear continuous region. The truck is limited to the lower of the performance limits as set by either the motor or power amplifier temperature. For example, if the motor temperature were 150° C., and the power amplifier temperature were 75° C., the performance limit would be 50%, not 75%.

Zone 3 indicates that region in which the truck is shut down (0% performance). This performance area occurs whenever the motor temperature exceeds 170° C., or the amplifier temperature rises above 110° C.

When Zone 3 is reached, the truck will be automatically turned off by the controller, and an alarm will sound.

The truck will not be permitted to travel again until the key is turned off and on again, and the temperatures of both the motor and amplifier have fallen into Zone 2, i.e. below the 20% performance level.

Figure 4A:
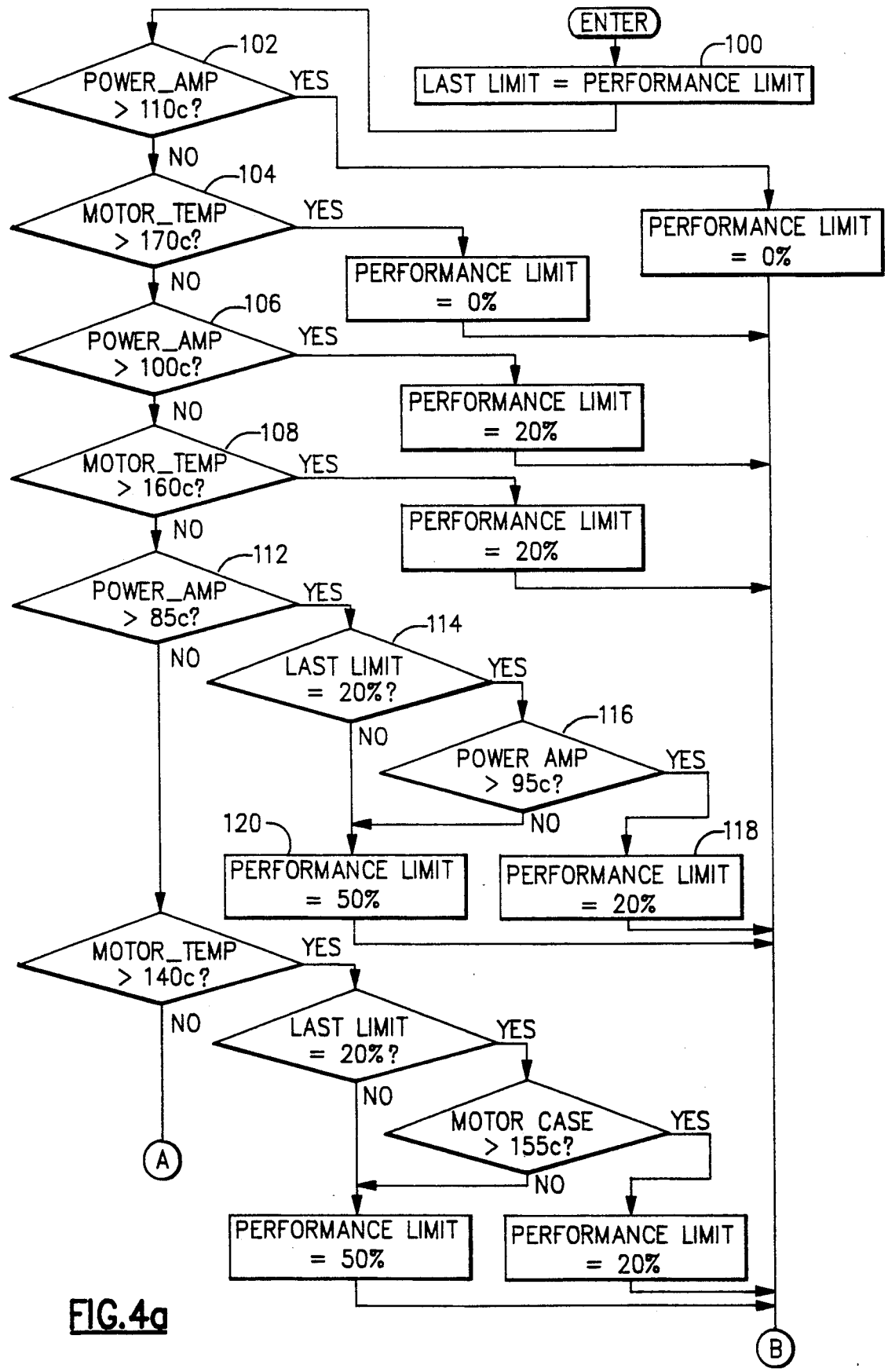
FIGS. 4a through 4b depict a flow chart for the multi-step temperature limiting scheme, shown in FIG. 2.
Figure 4B:
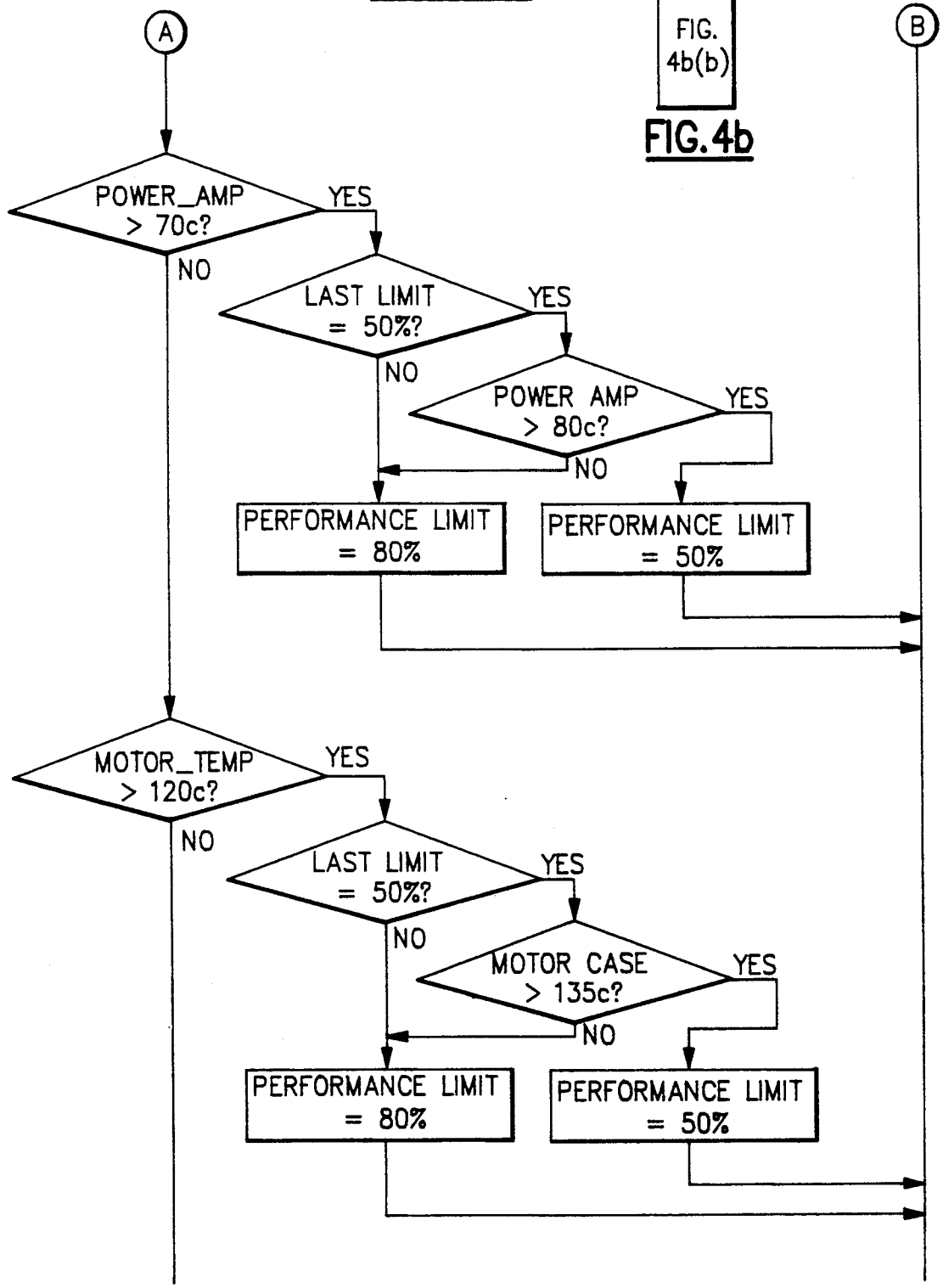
Figure 4B:
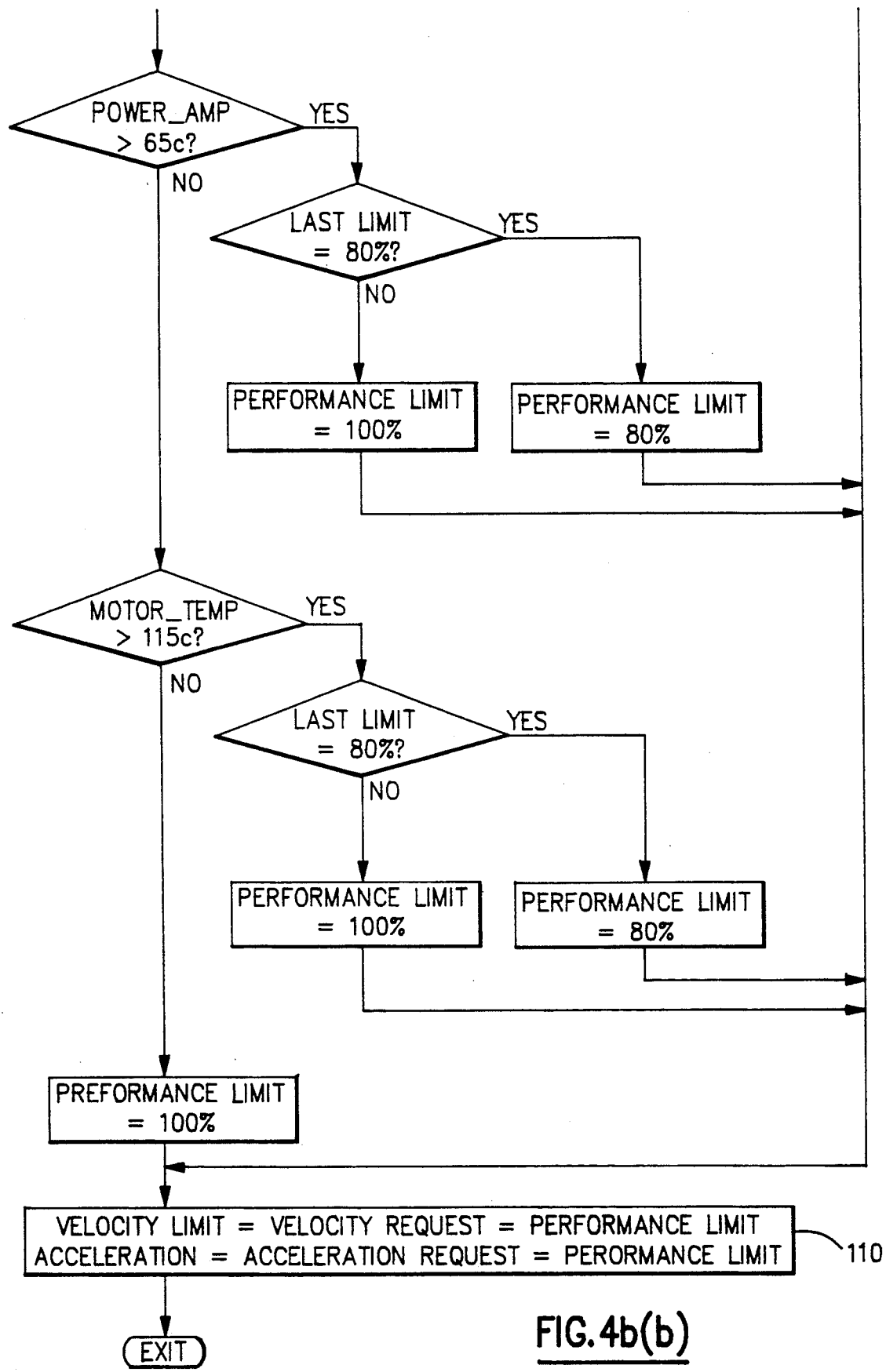

Referring to FIGS. 4a and 4b, there is shown a flow chart of the multi-step, temperature limiting method of the present invention, based upon the discrete performance zones of FIG. 2.

The method seeks to check high temperatures first and lowest temperatures last. This assures that the lowest performance will be allowed under derating conditions.

A variable, called: "last limit," is used to store the current performance limit, step 100. The controller 24 (FIG. 1) tests whether the temperature of the power amplifier 22 is greater than 110° C., step 102. If the temperature of the power amplifier is less than 110° C., the controller 24 determines whether the temperature of the motor 12 is greater than 170° C., step 104. If the motor temperature is less than 170° C., the controller then determines whether the temperature of the power amplifier is greater than 100° C., step 106. If the temperature of the power amplifier is less than 100° C., the controller 24 determines whether the temperature of the motor is greater than 160° C., step 108.

At any point in the foregoing procedure, if controller 24 determines that either the motor or amplifier temperature exceeds the predetermined value, the performance level is accordingly set, either at 0% to 20%, as the case may be (FIG. 4a). Once the performance level is set at either of these values, the program enters the last block, (block 110) in FIG. 4b, wherein the velocity limit is calculated as the requested velocity, multiplied by the respective performance level. Therefore, in the case where the performance level is 0%, the velocity limit must also be 0 (shut down). Similarly, acceleration is calculated as the product of the acceleration request, multiplied by the performance level.

In the discrete step process of FIG. 2, wherein the temperature of the truck motor and power amplifier is controlled by limiting the acceleration and velocity of the vehicle, hysteresis must be considered.

Thus, the remainder of flow chart shown in FIGS. 4a and 4b shows the steps required to introduce hysteresis into the control system.

Once the controller determines that the performance limit is greater than 0% and 20%, step 108, controller 24 determines whether the temperature of the power amplifier 22 is greater than 85° C., step 112. If the temperature of power amplifier 22 is greater than 85° C., the controller 24 decides whether the last limit was equal to 20%, step 114.

If this is so, the controller determines whether the power amplifier temperature is greater than 95° C., step 116. If that is also the case, the performance level is maintained at 20%, step 118, and the acceleration and velocity limits are factored down to 20%, step 110. If, however, either the last performance level was not equal to 20%, or the power amplifier temperature is less than 95° C., steps 114 and 116, respectively, then the performance level is set at 50%, step 120. Velocity and acceleration are then halved, in accordance with step 110 of FIG. 4b.

Hysteresis is accounted for repeatedly in the flow chart for various temperature levels of the motor and power amplifier. Thus, measurements are made by the controller for motor temperatures exceeding 140° C., 120° C., and 115° C., respectively.

Similarly, tests are made for respective power amplifier temperatures exceeding 85° C., 70° C., and 65° C.

In the preferred embodiment, a truck motor must cool down several degrees (e.g., 5° C.) below the trip point, before the performance level for the vehicle is allowed to regain one level step in performance. This eliminates cyclic surging that may occur at a limit trip point, had hysteresis not been introduced.

For example, if the motor temperature is 118° C., and the power amplifier temperature is 86° C., the flow chart procedure dictates that the power amplifier temperature will set the performance level at 50%, overriding the higher performance level of 80% or 100%. These higher levels would have been set, where the motor temperature alone had been considered.

Figure 5:
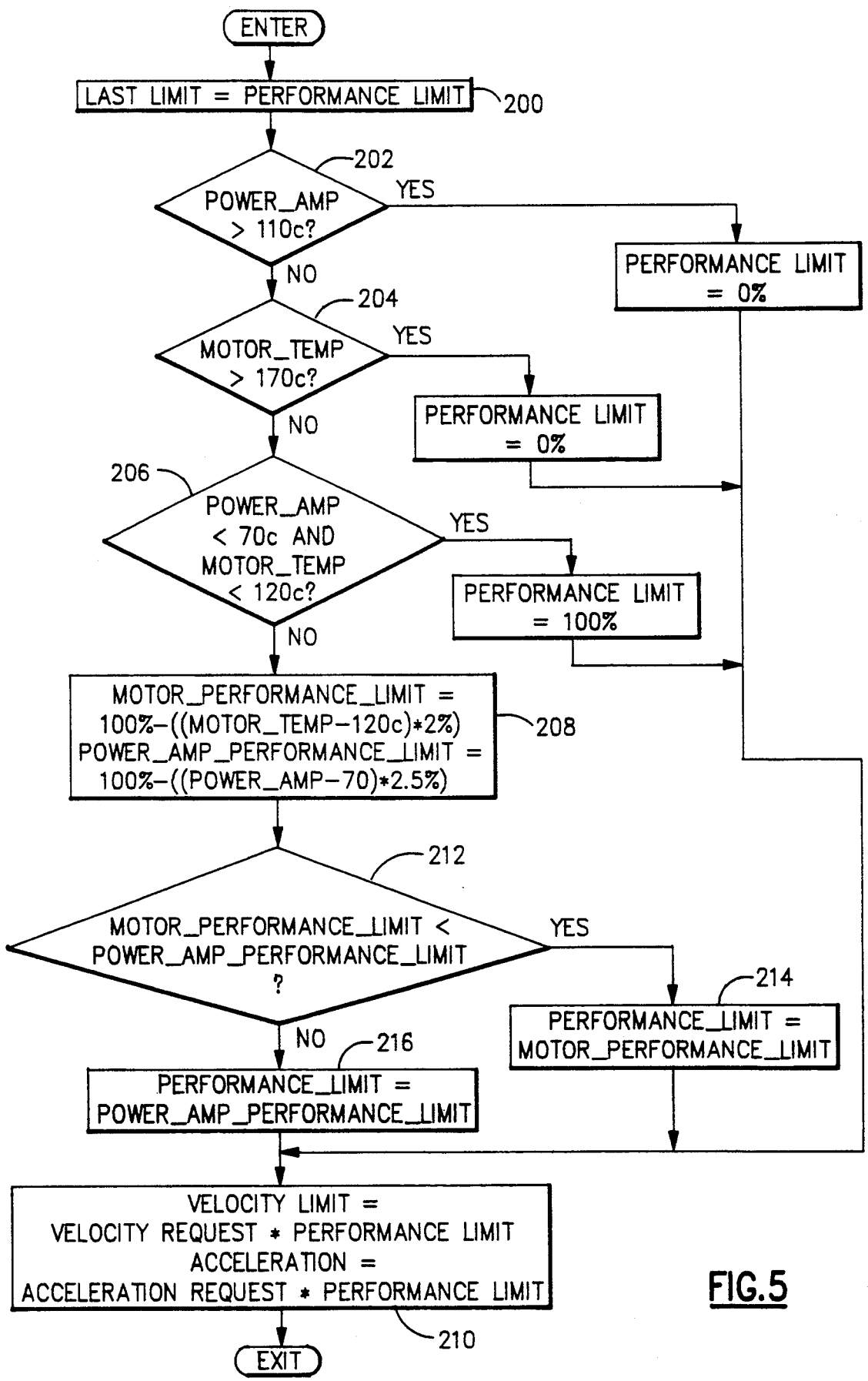
FIG. 5 illustrates the flow chart for the continuous temperature limiting process of this invention, in accordance with the alternate embodiment shown in FIG. 3.

Referring to FIG. 5, there is shown a flow chart for the continuous, temperature limiting method of the alternate embodiment presented in FIG. 3.

In this method, first the level of performance is checked for zone 3 (0% operation), and then zone 1 (100%).

If the truck is not operating in zone 1 or zone 3, then the performance level is calculated for motor temperature and power amplifier temperature. The lesser of the performance levels for either temperature calculation is selected.

Although the procedure shown in this embodiment is based upon formulas that are linear, the procedure would work just as well with any other continuous function.

The "last limit" variable is now set to the performance level, according to step 200. Once again, exceedingly high temperatures are used as an upper limit for the system. That is, if the power amplifier exceeds 110° C., steps 202 and 204, respectively, the performance level is set to 0%.

The velocity and acceleration are decreased to 0, step 210.

If, however, both the power amplifier temperature is less than 70° C., and the motor temperature is less than 120° C., step 206, the performance level will be set to 100%. Velocity and acceleration will remain unchanged, step 210.

If, however, the power amplifier temperature is greater than 70° C., or the motor temperature is greater than 120° C., step 206, the motor performance level will be set to the equation based on present motor temperature, shown in step 208.

Similarly, a limit is set for the power amplifier temperature, step 208.

If the motor performance level is less than the power amplifier performance limit, step 212, the system performance limit is set to the motor performance limit, step 214. Otherwise, the system performance limit is set to the power amplifier performance limit, step 216.

In either case, the velocity and acceleration are adjusted by multiplying the velocity request, by the performance level factor, and the acceleration request, by the performance level factor, respectively, step 210.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A system for preventing a motor of a material handling vehicle from overheating by controlling vehicular performance of said material handling vehicle, comprising:
    a motor for driving said material handling vehicle;
    temperature sensing means operatively connected to said motor of said material handling vehicle for determining its operating temperature; and
    control means operatively connected to said temperature sensing means and to said motor for controlling performance of said material handling vehicle, said control means adjusting maximum velocity and rate of change of velocity of said material handling vehicle as a function of its operation temperature, whereby said motor is prevented from overheating.

2. The system in accordance with claim 1, further comprising:
    motor speed detection means operatively connected to said motor and to said control means for providing information representative of actual motor speed to said control means, whereby said control means is operative to additionally control the speed of said motor as a function of the operating temperature of said motor.

3. The system in accordance with claim 1, wherein said temperature sensing means is disposed adjacent said armature of said motor to provide information that represents armature temperature of the motor.

4. The system in accordance with claim 3, wherein said temperature sensing means comprises means to provide a variable electrical signal as a function of temperature.

5. The system in accordance with claim 1, wherein said control means adjusts motor performance in accordance with predetermined temperature constraints upon said motor temperature.

6. A system for preventing a power amplifier of a material handling vehicle from overheating by controlling vehicular performance of said material handling vehicle, comprising:
    a motor for driving said material handling vehicle;
    a power amplifier operatively connected to said motor for supplying said motor with power;
    temperature sensing means operatively connected to said power amplifier of said material handling vehicle for determining its operating temperature; and
    control means operatively connected to said temperature sensing means, said motor and to said power amplifier for controlling performance of said material handling vehicle, said control means adjusting maximum velocity and rate of change of velocity of said material handling vehicle as a function of the power amplifier temperature, whereby said power amplifier is prevented from overheating.

7. The system in accordance with claim 6, further comprising: motor speed detection means operatively connected to said motor and to said control means for providing information representative of actual motor speed to said control means, whereby said control means is operative to additionally control the speed of said motor as a function of said power amplifier temperature.

8. The system in accordance with claim 6, wherein said temperature sensing means comprises means to provide a variable electrical signal as a function of temperature.

9. The system in accordance with claim 6, wherein said control means adjusts motor performance in accordance with predetermined temperature constraints upon said power amplifier temperature.

10. A system for preventing a motor and power amplifier of a material handling vehicle from overheating by controlling vehicular performance of said material handling vehicle, comprising:
    a motor for driving said material handling vehicle;
    a power amplifier operatively connected to said motor for supplying said motor with power;
    temperature sensing means operatively connected to said power amplifier and said motor of said material handling vehicle for determining each of their operating temperatures; and
    control means operatively connected to said temperature sensing means, said motor and to said power amplifier for controlling performance of said material handling vehicle, said control means adjusting maximum velocity and rate of change of velocity of said material handling vehicle as a function of both the power amplifier temperature and motor temperature, whereby said power amplifier and said motor are prevented from overheating.

11. The system in accordance with claim 10, further comprising:
    motor speed detection means operatively connected to said motor and to said control means for providing information representative of actual motor speed to said control means, whereby said control means is operative to additionally control the speed of said motor as a function of said power amplifier temperature.

12. The system in accordance with claim 10, wherein said temperature sensing means comprises means to provide a variable electrical signal as a function of temperature.

13. The system in accordance with claim 10, wherein said control means adjusts motor performance in accordance with predetermined temperature constraints upon said motor temperature and said power amplifier temperature.

14. A method for preventing the overheating of a motor of a material handling vehicle by controlling performance of said material handling vehicle as a function of temperature of said motor, said method comprising the steps of:
 a) monitoring temperature of said motor of said material handling vehicle; and
 b) controlling maximum velocity and rate of change of velocity of said material handling vehicle within given constraints, when said motor reaches a first predetermined temperature.

15. The method of claim 14, comprising the further step of:
 c) repeating steps (a) and (b) when the temperature of said motor exceeds said first predetermined temperature and reaches a second predetermined temperature, and wherein given constraints for said velocity rate of change will be confined to more stringent control.

16. The method of claim 14, wherein said velocity rate of change controlling step (b) is performed in discrete steps along a performance curve, as a function of changes in temperature of said motor.

17. The method of claim 4, wherein said velocity rate of change controlling step (b) is performed continuously along a performance curve, as a function of changes in temperature of said motor.

18. A method for preventing the overheating of a power amplifier of a material handling vehicle by controlling performance of said material handling vehicle as a function of temperature of said power amplifier, said method comprising the steps of:
 a) monitoring temperature of said power amplifier of said material handling vehicle; and
 b) controlling maximum velocity and rate of change of velocity of said material handling vehicle within given constraints, when said power amplifier reaches a first predetermined temperature.

19. The method of claim 18, comprising the further step of:
 c) repeating steps (a) and (b) when the temperature of said power amplifier exceeds said first predetermined temperature and reaches a second predetermined temperature, and wherein said velocity rate of changes will be confined to more stringent control.

20. The method of claim 18, wherein said controlling step (b) is performed is discrete steps along a performance curve, as a function of changes in temperature of said power amplifier.

21. The method of claim 18, wherein said controlling step (b) is performed continuously along a performance curve, as a function of changes in temperature of said power amplifier.

22. A method for preventing the overheating of a power amplifier and a motor of a material handling vehicle by controlling performance of said material handling vehicle as a function of temperature of said power amplifier and said motor, said method comprising the steps of:
 a) monitoring temperature of said power amplifier and said motor of said material handling vehicle; and
 b) controlling maximum velocity and rate of change of velocity of said material handling vehicle, when said power amplifier and said motor each reach a respective first predetermined temperature.

23. The method of claim 22, comprising the further step of:
 c) repeating steps (a) and (b) when respective temperatures of said power amplifier and said motor exceed their corresponding first predetermined temperature and thereafter reach a second respective predetermined temperature.

24. The method of claim 22, wherein said controlling step (b) is performed is discrete steps along a performance curve, as a function of changes in temperature of said power amplifier and said motor.

25. The method of claim 22, wherein said controlling step (b) is performed continuously along a performance curve, as a function of changes in temperature of said power amplifier and said motor.

* * * * *